Oct. 25, 1960
B. E. CURRAN
2,957,628
PRESSURE AND TEMPERATURE CONTROL OF AIR MIXING OUTLET UNIT
Filed Aug. 14, 1958
5 Sheets-Sheet 1

INVENTOR.
Bernard E. Curran
BY
Robert S. Churchill
ATTORNEY

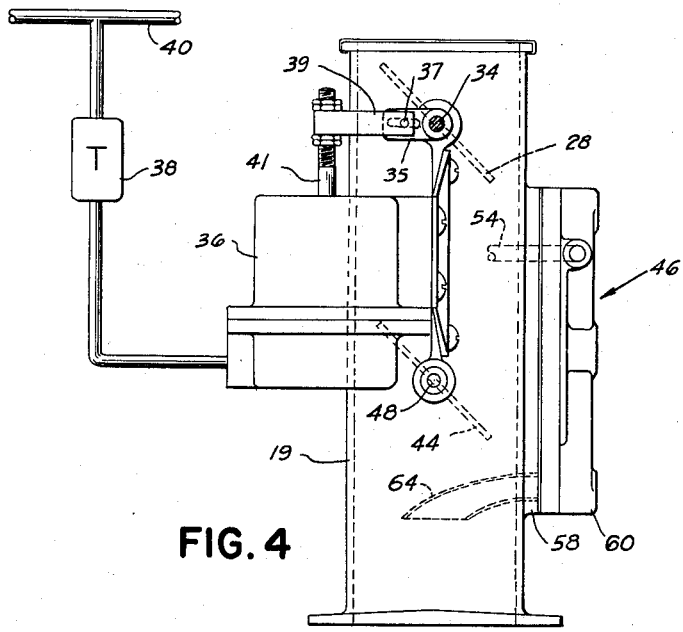
FIG. 4
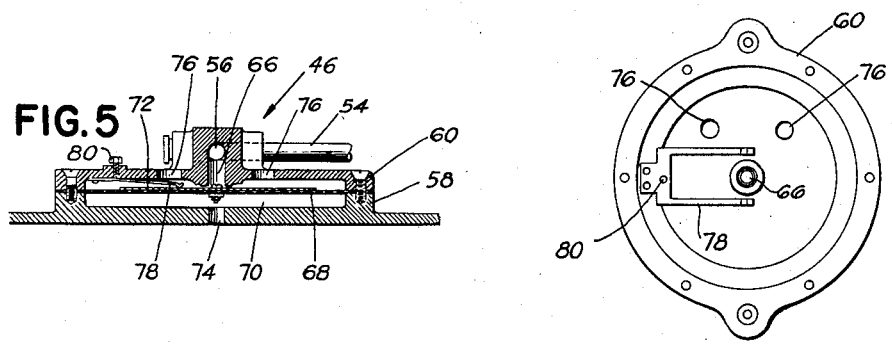
FIG. 5
FIG. 6
INVENTOR.
Bernard E. Curran
BY
ATTORNEY Oct. 25, 1960     B. E. CURRAN     2,957,628
PRESSURE AND TEMPERATURE CONTROL OF AIR MIXING OUTLET UNIT
Filed Aug. 14, 1958     5 Sheets-Sheet 5
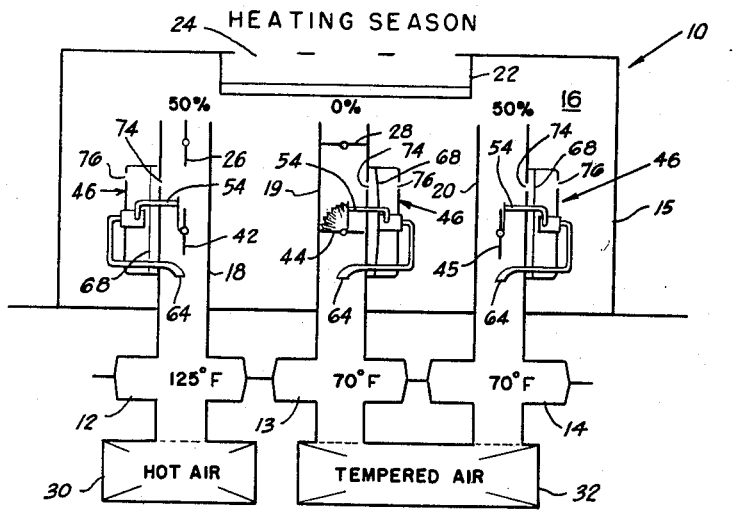
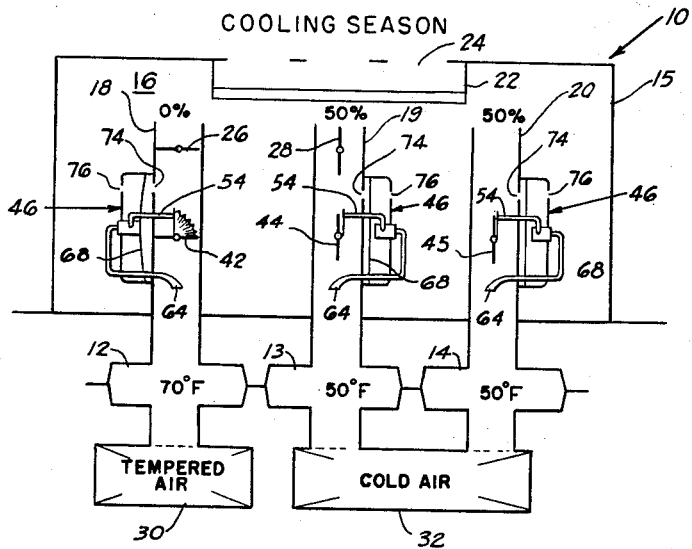
INVENTOR.
Bernard E. Curran
BY
*Robert F. Churchill*
ATTORNEY

United States Patent Office 2,957,628
Patented Oct. 25, 1960

2,957,628

PRESSURE AND TEMPERATURE CONTROL OF AIR MIXING OUTLET UNIT

Bernard E. Curran, Sewickley, Pa., assignor to H. H. Robertson Company, Pittsburgh, Pa., a corporation of Pennsylvania Filed Aug. 14, 1958, Ser. No. 754,960

10 Claims. (Cl. 236—13)

This invention relates to an air discharge outlet unit for use in an air conditioning and distributing system.

The invention has for an object to provide a novel, improved and efficient air distributing outlet unit of the character specified having provision for controlling the discharge of conditioned air from the outlet unit in a manner such as to maintain a substantially constant discharge volume during both the winter heating and summer cooling seasons.

With this general object in view and such others as may hereinafter appear, the invention consists in the air discharge outlet unit and in the various structures, arrangements and combinations of parts hereinafter described and particularly defined in the claims at the end of this specification.

In the drawings illustrating the preferred embodiment of the invention:

Fig. 4 is a side elevation of a portion of the unit as seen from the vertical line 4—4 of Fig. 1;

Fig. 5 is a cross sectional detail view of pneumatic control mechanism as viewed from the horizontal line 5—5 of Fig. 1;

Fig. 6 is a detail view as seen from the line 6—6 of Fig. 3;

Fig 7 is a diagrammatic view illustrating the positions assumed by the volume control and pressure reduction dampers during the peak of the winter heating season; and Fig. 8 is a view similar to Fig. 7 illustrating the positions assumed by the volume control and pressure reduction dampers during the peak of the summer cooling season.

Figure 1:
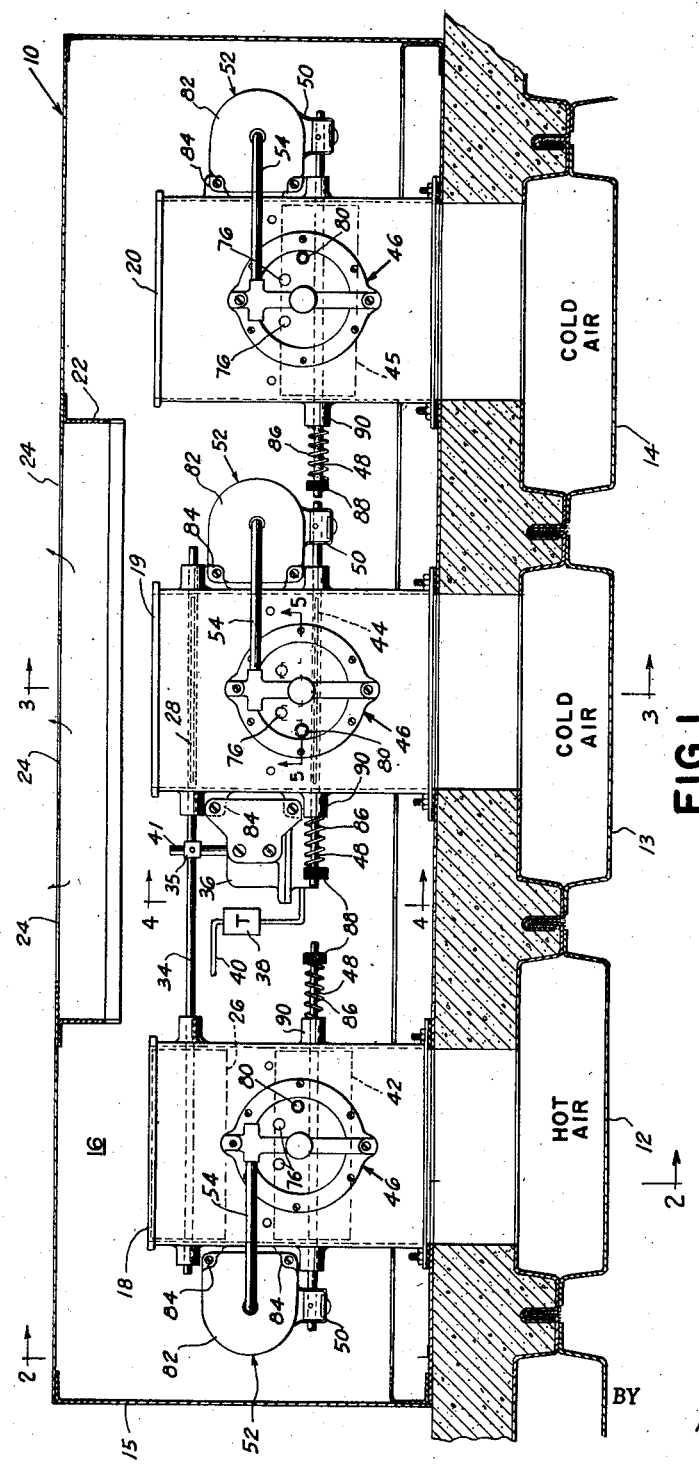
Fig. 1 is a front elevation partly in cross section of an air discharge outlet unit embodying the present invention.

In general the present invention contemplates a novel and improved air discharge outlet unit for a multiple duct air conditioning and distributing system and whose construction enables highly efficient and accurate control of the flow of air to be maintained whereby to provide a constant discharge volume of air flow during both the winter heating season and the summer cooling season. In a copending application of Bernard E. Curran, et al., Serial No. 649,355, filed March 29, 1957, having the same assignee as the instant application, the air discharge outlet unit therein shown is supplied with air of different condition through each of a pair of stacks connected to air supply ducts. The differently conditioned air under substantial pressure and at high velocity is caused to flow through said stacks into the outlet unit, the differently conditioned air being mixed in the outlet unit and discharged into the room, and the volume as well as the proportions of the differently conditioned air in each stack may be varied by operation of volume control dampers under the control of a thermostat in the room. Pneumatically operated pressure regulating dampers are also provided in the outlet unit disclosed in said copending application for maintaining a constant static pressure of air supplied through each stack irrespective of variations in pressure of the air in the supply ducts and also irrespective of the variations in the proportions of the differently conditioned air delivered by each stack in accordance with the movement of the volume control dampers in response to the room thermostat.

The thermostatically operated volume control or outlet dampers illustrated and described in the copending application, Serial No. 649,355, are arranged at right angles to each other for operation during the heating season and are operatively connected to each other to thereby simultaneously effect opening of one damper while the other damper is closing so that during the heating season the discharge of air from the hot air stack and from the cold air stack may be modulated against each other, thus providing a constant-volume variable-temperature type of outlet unit. During the cooling season both of the stacks are supplied with cold air, and the position of the dampers with relation to each other is changed from a position at right angles to each other to one wherein they are parallel and operate to open and close together so as to vary in equal amounts the cold air which is delivered from each stack, thus providing during the cooling season a constant-temperature, variable-volume outlet unit.

In accordance with the present invention the air discharge outlet unit is constructed to provide for the delivery of a constant volume of air to the mixing chamber whereby a stable and uniform rate of air flow from the discharge outlet of the chamber is maintained during both the winter heating season and the summer cooling season and to eliminate any need for a seasonal change-over of the volume control dampers. In the illustrated embodiment of the invention this is accomplished by providing, in addition to the first and second stacks supplying hot and cold air to the outlet unit, a third air stack operatively connected to a cold air supply duct and an outlet unit for also delivering a supply of cold air to the mixing chamber of the outlet unit. During the winter heating season the first two stacks are arranged to supply hot and cold or tempered air respectively in proportions equal to 50% of the total volume of air supplied to the mixing chamber, and the third stack is arranged to deliver a substantially constant supply of tempered air equal to the remaining 50% of the total volume, provision being also made for maintaining a substantially constant static pressure of the air supplied through each stack as will be hereinafter described. During the summer cooling season cold or tempered air may be supplied to all three of the stacks.

Figure 3:
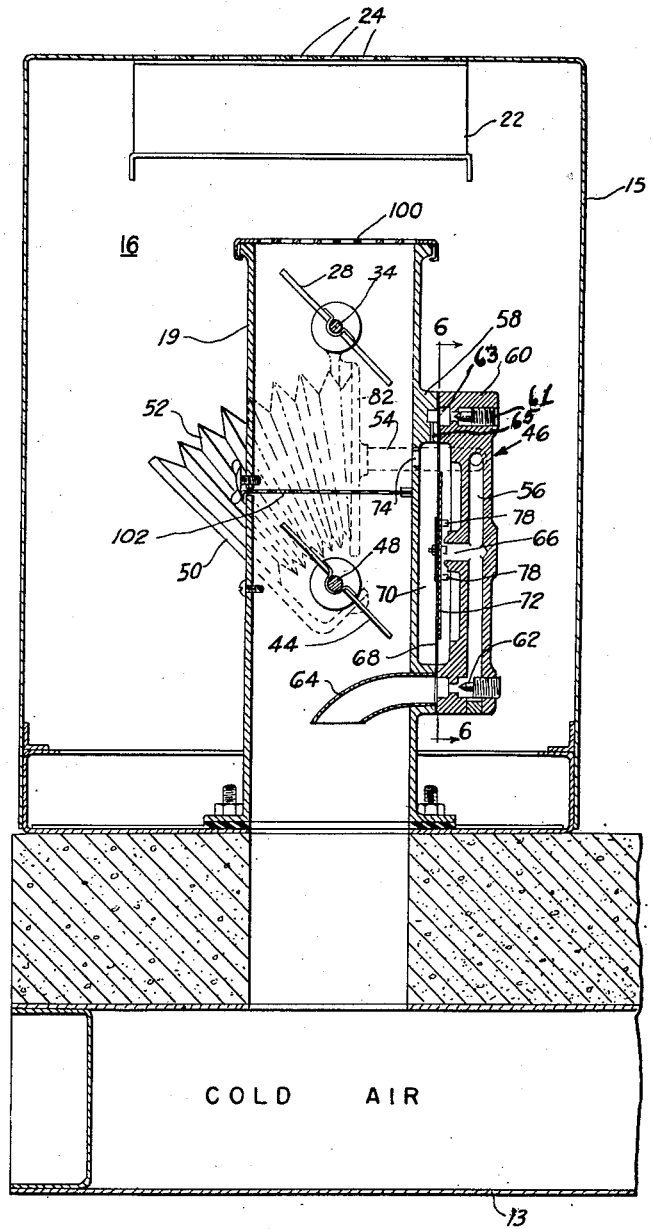
Fig. 3 is a vertical section taken on the line 3—3 of Fig. 1.

Referring now to the drawings, the air discharge outlet unit and control assembly indicated generally at 10 is herein shown as designed to be used with a multiple duct air conditioning and distributing system of the type shown in the patent to Richard P. Goemann, No. 2,729,429, issued January 3, 1956, wherein differently conditioned air, such as hot air and cold air or tempered air, may be conducted through air supply cells 12, 13, 14, respectively forming components of a load supporting floor. The illustrated outlet unit includes an outer casing 15 defining a mixing chamber 16 into which the hot air and tempered air respectively may be delivered from the air supply cells 12, 13, 14 through stacks 18, 19, 20 enclosed by the casing 15 and connected to openings provided in the upper walls of the air cells 12, 13, 14 respectively. The air delivered to the mixing chamber 16 passes through a baffle or sound trap member 22 of any usual or preferred type and is discharged into the area to be conditioned through fixed outlet grille openings 24 provided in the top wall of the casing 15. The first two air stacks 18, 19 having their dampers and operating mechanism arranged as a coupled pair are each provided with a volume control or outlet damper 26, 28 respectively adjacent the upper ends thereof, and each stack 18, 19 is also provided with a pressure reduction damper 42, 44 respectively adjacent the lower ends thereof. The third air stack 20 is not provided with a volume control or outlet damper and serves to supplement the source of air supply to the mixing chamber of the outlet unit and provide a constant volume of cold or tempered air. However, the third air stack is provided with a pressure reduction damper 45 adjacent the lower end thereof which is arranged to control the flow of air into the stack. As diagrammatically illustrated in Fig. 7, the air conducting cell 12 may be connected to the source of hot air by a header duct 30, and the air conducting cells 13 and 14 may be connected to the source of tempered air or cold air by a header duct 32 having substantially twice the capacity of the header duct 30. As illustrated in Fig. 3, each stack 18, 19 and 20 may be further provided with perforated slide dampers for controlling the air flow therethrough and which includes an upper slide damper 100 slidably mounted on the top of its stack and an intermediate slide damper 102 mounted above the pressure reducing damper in each stack.

The volume control or outlet dampers 26, 28, as shown in Fig. 1, are mounted on a shaft 34 extending through both stacks 18, 19, and the dampers are arranged at right angles relative to each other so that rotation of the shaft 34 in one direction will move one damper in a closing direction and the other damper in an opening direction, and conversely, rotation of the shaft 34 in the opposite direction will effect closing of the open damper and opening of the closed damper. The volume control or outlet dampers 26, 28 are automatically adjusted pneumatically by an air motor 36 actuated by a room thermostat diagrammatically indicated at 38 which acts as a valve between a compressed air line 40 and the motor to increase or decrease the air pressure to the motor in accordance with the room temperature.

Figure 2:
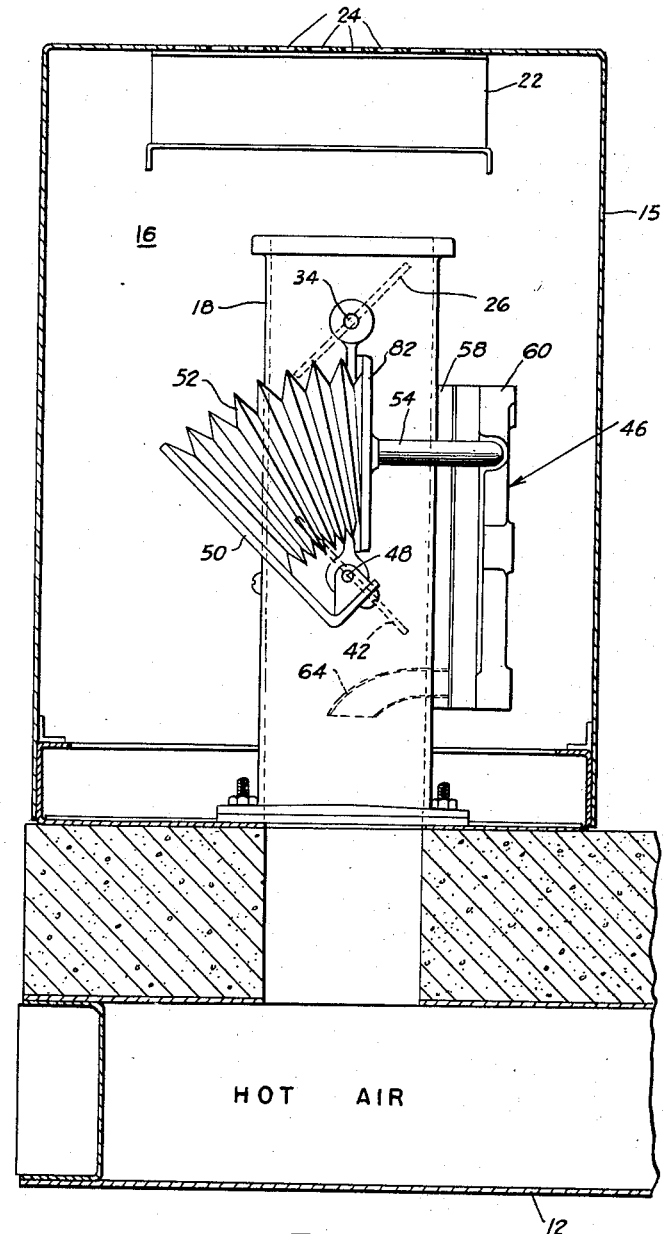
Fig. 2 is a vertical section taken on the line 2—2 of Fig. 1.

As shown in Fig. 4, the shaft 34 is provided with a slotted arm 35 fast thereon arranged to cooperate with a pin 37 carried by an arm 39 secured to and extended laterally from the piston stem 41 of the motor 36. Thus, when the temperature in the room drops, the thermostat reduces the air pressure to the motor causing the stem 41 to retract and to rock the hot air damper 26 (see Fig. 2) from a closed or partially closed position to an open position. At the same time the cold air damper 28, arranged at right angles to the damper 26 on the shaft 34 (see Fig. 3) is moved from an open or partially open position to a closed position. Conversely, when the temperature in the room increases, the thermostat increases the air pressure to the motor 36 causing the stem 41 to project upwardly whereby to reverse the direction of movement of the dampers to decrease the supply of hot air and increase the supply of cold air. The cooperation between the pressure reduction dampers 42, 44, disposed in each stack 18, 19 on the upstream side of the volume control or outlet dampers 26, 28 respectively, and the outlet dampers, is effective to substantially restore the static pressure in the portions of the stacks 18, 19 between the sets of dampers to a predetermined value when variations in such pressure occur as a result of the opening and closing of the outlet dampers in response to the thermostat 38 or occur as a result of variations in the pressure of the air supply entering the stacks. The stack 20 is also provided with a pressure reducing damper 45 for controlling variation in upstream pressure and maintaining a substantially constant static pressure in its stack. Each pressure reduction damper is controlled by an individual, pneumatically operated static pressure regulator, indicated generally at 46, of the type disclosed in the copending application referred to. As herein illustrated, each pressure reduction damper is mounted on a shaft 48 which is connected by a rigid arm 50 to the movable end of a bellows 52. The stationary end 82 of the bellows 52 is connected by an air tube 54 to a chamber 56 formed in the regulator unit 46. As herein shown, each regulator unit includes a base portion 58 formed integrally with the side of its stack and a cover plate 60 secured to the base portion 58. The air tube 54 communicates with the upper end of the chamber 56, the lower end of the chamber being connected through an adjustable needle valve 62 and pickup tube 64 extending into the stack in the path of flow of the main air supply in the stack on the upstream side of its pressure reduction damper 42, 44, 45. The chamber 56 is also provided with an opening comprising a bleeder port 66 arranged to cooperate with a flexible diaphragm 68. As shown in Fig. 6, adjacent faces of the base portion 58 and cover plate 60 are recessed to provide a second chamber 70 across which the flexible diaphragm 68 extends, the diaphragm being provided with a metal contact plate 72 on one side thereof for cooperation with the bleeder port opening 66. One side of the chamber 70, separated by the diaphragm, is provided with a static pressure sensing opening 74 in communication with the air supply in the stack at a point between each mixing damper 26, 28 and its pressure reduction damper 42, 44 in stacks 18, 19 and the sensing opening 74 being similarly disposed on the downstream side of the pressure reduction damper 45 in stack 20. The other side of the chamber 70 is open to the mixing chamber 16 through openings 76 formed in the cover plate 60. As illustrated in Figs. 5 and 6, the contact plate 72 of the diaphragm is normally resiliently maintained in a position spaced from the bleed port 66 by a leaf spring member 78 secured to the inner face of the cover plate 60 and having two legs spaced apart and engaging the contact plate to urge it away from the bleed port. The effective pressure of the leaf spring 78 may be adjusted by a set screw 80 mounted in the cover plate 60 and which engages a portion of the leaf spring as shown. Normally, when a volume control damper 26 or 28 is in an open position the pressure of the air from the main air supply passing through the stack which is picked up by the pickup tube 64 and passed into chamber 56 is not sufficient to inflate the bellows 52, and such air is permitted to pass through the bleeder port 66 and openings 76. Likewise, the air pressure in the stack between a volume control or outlet damper 26, 28 and its corresponding pressure reduction damper 42, 44 when a volume control damper is in an open position is not sufficient to overcome the spring and expand the diaphragm 68 so that the contact plate 72 will remain in its spaced position, and the air is permitted to escape through the bleed port 66. However, when a volume control or outlet damper is moved in a closing direction the air pressure in the stack between the outlet and pressure reduction dampers is increased, and such increased pressure overcomes the force of spring 78, and the diaphragm is expanded, moving the contact plate 72 in a direction to close the bleed port 66. As a result the air pressure in the chamber 56 is built up and the bellows 52 inflated which in turn effects a rocking of the pressure reduction damper in a closing direction to reduce the flow of air into the stack, thus effecting a reduction in the pressure in the stack between the two dampers. Thus, a substantially constant pressure and stable flow of the air being discharged into the mixing chamber is maintained.

On the other hand, in the event the main air supply pressure should vary such as to increase the flow of air into the pickup tube 64 the air pressure in chamber 56 will also be increased to effect inflation of the bellows and rocking of the pressure reduction damper in a closing direction to reduce the pressure, thus also tending to maintain a constant static pressure between the two dampers.

Likewise, the pressure reducing damper 45 in the stack 20, which is normally open to supply a constant volume of air to the chamber 16 at all times, is responsive to variations in the supply pressure as detected by any increase in pressure on the downstream side of its damper 45. The needle valve 62 may be adjusted to regulate the admission of air so that the bleed port 66 can normally exhaust more air than is admitted whereby to permit deflation of the bellows and opening of the pressure reduction damper as described. The description of the static pressure regulators for operating the pressure reducing dampers 42, 44 in the stacks 18, 19 also applies to the static pressure regulator for operating the pressure reduction damper 45 in the stack 30 except, of course, since the stack 20 has no volume control or outlet damper, the static pressure regulator will be responsive to the pressure in the stack 20 or in the chamber 16, which pressures are substantially equal to restore the static pressure therein to a predetermined value when deviations therefrom occur as a result of variations in air pressure on the upstream side of the damper 45.

As herein shown, the bellows 52 may comprise a pleated structure of relatively thin flexible material connected at one end to the fixed end plate 82 which may be supported from the stack by lugs 84 as shown in Fig. 1. The end plate 82 is provided with an opening therein for receiving the pipe 54 connecting the chamber 56 with the interior of the bellows. The other end of the flexible bellows 52 is connected to the movable arm 50 which is fixed to the damper shaft 48 to effect rotation thereof upon expansion and contraction of the bellows. A coil spring 86 normally holds the bellows in a collapsed position. It will be understood that the operating pressure of the air entering the pickup tube 64 is a measure of the total pressure of the air entering the stack from the main supply ducts. In operation when the bellows 52 is fully inflated the pressure reduction damper is fully closed, and when the bellows 52 is fully collapsed the pressure reduction damper is fully open. In order to effect return of the bellows from an inflated position to a deflated position, upon a reduction of the pressure in the chamber 56 the coil spring 86 is wound about the damper shaft 48, one end of the spring being fixed in a knurled collar 88 adjustably mounted on the shaft, the other end of the spring being fixed in the bearing hub 90 as shown.

In order to determine the static pressure within the hot and/or cold air stacks 18, 19 and 20 a removable connection in the form of a needle valve 61 is provided which may be easily removed and a suitable gauge for indicating the control pressure within the stack attached thereto. As shown in Fig. 3, the needle valve communicates with the interior of the stack through passageways 63, 65 and sensing opening 74, thereby enabling the interior stack pressure to be read on the gauge, not shown.

For convenience of description the air supply ducts and stacks have thus far been referred to as "hot air ducts," "cold air ducts" and "tempered air ducts." However, it will be understood that these terms are intended to mean differently conditioned air of any temperatures desired to be mixed and discharged into the room, hot and tempered air being preferably supplied for the winter heating season, and cold and tempered air being preferably supplied during the summer cooling season.

Referring now to Figs. 7 and 8, diagrammatically illustrating the positions of the dampers during the peak of the heating season and during the peak of the cooling season respectively, it will be seen that during the heating season it is preferred to supply hot air at a temperature of about 125° F. to the stack 18 and to supply tempered air at a temperature of about 70° F., or a temperature slightly lower than the normal room temperature desired, to the stacks 19, 20, as indicated in Fig. 7, and that during the cooling season the stack 18 will be supplied with tempered air at a temperature of about 70° F., and the stacks 19, 20 will be provided with cold air at a temperature of about 50° F. as indicated in Fig. 8.

In the operation of the air discharge outlet unit during the peak of the heating season when the thermostat is calling for maximum heat, the volume control or outlet damper 26 will be wide open to supply a maximum quantity of hot air and the volume control damper 28 will be closed as shown in Fig. 7. The stack 20, having no volume control or outlet damper, is arranged to deliver a constant supply of tempered air to the outlet unit. The individual static pressure regulators associated with the stacks 18, 19 cause their respective dampers 42, 44 to operate and assume appropriate positions in response to variations in control pressure from a preselected control stack pressure and maintain a constant static pressure within their respective stacks. The static pressure regulator associated with the stack 20 will also cause the pressure reduction damper to assume an appropriate position in response to variations in the air supply pressure. Thus, at the peak of the heating season, as shown in Fig. 7, the hot air stack 18 will supply 50% of the total volume delivered to the chamber 16, the stack 19 will supply no air, and the stack 20 will supply the remaining 50% of the total volume delivered to the mixing chamber 16. Thereafter, when the thermostat calls for less heat the damper 26 will be moved in a closing direction to deliver proportionately less hot air, and the damper 28 will be moved in an opening direction to deliver proportionately more tempered air, the volume from the coupled pair of stacks 18, 19 being approximately equal to 50% of the total volume delivered to the chamber 18, the remaining 50% being supplied by the open stack 20 whereby the total volume of air delivered to the chamber 16 remains constant at all times to provide a stable and uniform air discharge flow from the outlet grille openings 24 into the room.

On the other hand, as illustrated in Fig. 8, during the peak of the cooling season the damper 26 will be entirely closed so that no tempered air is delivered from the stack 18 to the chamber 16, and the damper 28 will be wide open so that the stack 19 will deliver its full capacity of cold air which comprises 50% of the volume of air delivered to the chamber 16, the remaining 50% of cold air being delivered by the open stack 20. Thereafter, when the thermostat calls for less cold air the damper 26 will move in an opening direction to deliver tempered air and the damper 28 will move in a closing direction to deliver less cold air. Under these conditions the combined delivery of air from stacks 18 and 19 will equal 50% of the total volume of air delivered from all three of the stacks to the mixing chamber, and stack 20 will supply the other 50% of the total air delivered to the mixing chamber and discharged therefrom. In this manner it will be observed that the total volume discharged will remain constant at all times.

From the above description it will be observed that the present air discharge outlet unit is constructed and arranged to provide a constant volume of air passing from the stacks into the mixing chamber and through the fixed outlet grille openings into the room whereby to provide a stable and uniform flow of air into the room at all times during both the winter heating season and the summer cooling season without changing the position of the volume control dampers relative to each other.

While the preferred embodiment of the invention has been herein illustrated and described, it will be understood that the invention may be embodied in other forms within the scope of the following claims.

Having thus described the invention, what is claimed is:

1. For use in an air conditioning and air distributing system, an outlet unit comprising a chamber having an outlet opening and air inlet means, said air inlet means including a pair of inlets, each connected to a supply of differently conditioned air and together arranged to deliver about one-half of the total volume of air to the chamber, and a single inlet connected to a supply of conditioned air arranged to deliver the other approximately one-half of the total volume of air to the chamber, means for maintaining a constant static pressure within each inlet, and thermoresponsive means for controlling and proportioning the amounts of the differently conditioned air delivered by each one of the pair of coupled inlets to the chamber whereby to provide a substantially constant total volume of air to said chamber and a stable flow of air from the outlet under all conditions.

2. An outlet unit as defined in claim 1 wherein the means for maintaining a constant static pressure in said individual inlet is arranged to maintain the constant volume of air delivered by said individual inlet equal to about said one-half of the total volume.

3. In an air conditioning and distributing system of the character described, in combination, an air discharge outlet unit comprising a casing defining a mixing chamber having a discharge outlet, and three spaced inlet stacks adapted for connection to air supply ducts through which air of different condition is caused to flow from the supply ducts into said chamber, means for maintaining a constant static pressure within each inlet, two of said stacks each having a thermostatically controlled volume control damper, the volume control damper in one stack being arranged at right angles to the volume control damper in the second stack, the third stack being open to deliver a constant volume of air equal to about one-half of the total volume of air supplied to the mixing chamber, the remaining approximately one-half of the total volume of air being delivered by the other two stacks and provided by the modulation of the volume control dampers in each stack to deliver less air from one stack and more air from the other stack while delivering one-half of the total volume of air whereby to provide a substantially constant total volume of air delivered to the mixing chamber and a stable discharge flow from the discharge outlet of the chamber under all conditions.

4. An air discharge outlet unit as defined in claim 3 wherein the means for maintaining a constant static pressure within each inlet includes an automatic static pressure regulator associated with each stack for maintaining a constant static pressure and stable air flow through said stacks.

5. An air discharge outlet unit as defined in claim 3 wherein the first stack is supplied with hot air and the second and third stacks are supplied with tempered air under one set of conditions, and wherein during the peak of said one set of conditions the first stack is fully open to deliver a volume of hot air equal to one-half of the total volume delivered to the mixing chamber, the second stack being closed, and the third stack being fully open to deliver to the mixing chamber a volume of tempered air equal to the remaining one-half of the total volume delivered to the mixing chamber.

6. An air discharge outlet unit as defined in claim 3 wherein the first stack is supplied with tempered air, and the second and third stacks are supplied with cold air during the summer cooling season wherein the first stack will be entirely closed during the peak of the summer cooling season, the second stack will be wide open to deliver its full capacity of cold air equal to one-half of the total volume delivered to the mixing chamber, and the third stack will deliver its full capacity of cold air equal to the remaining one-half of the total volume of air delivered to the mixing chamber.

7. An air discharge outlet unit as defined in claim 3 wherein the thermostatically controlled means for operating said volume control dampers includes an air motor operatively connected to a supply of compressed air and to said dampers, and a thermostatically controlled valve between said supply and said motor.

8. An air discharge outlet unit as defined in claim 3 wherein the means for maintaining a constant static pressure within each inlet includes a pressure reduction damper in each stack, and individual static pressure regulating means for each pressure reduction damper for restoring the static pressure within its stack to a predetermined value when variations occur in such static pressure.

9. An air discharge outlet unit as defined in claim 3 wherein the cross sectional area of all three stacks are equal.

10. An air conditioning and distributing system of the character described, in combination, an air discharge outlet unit comprising a casing defining a mixing chamber and having a fixed discharge outlet, three spaced vertical air inlet stacks enclosed by said casing and having a portion thereof adapted for connection to air supply ducts and through which air of different condition is caused to flow from the supply ducts into said chamber, the first two stacks forming a coupled pair each having a thermostatically controlled volume control damper at its upper end, the volume control damper in the first stack being arranged at right angles to the volume control damper in the second stack, all three stacks having a pressure reduction damper and an automatic static pressure regulator associated with each pressure reduction damper responsive to variations in static pressure within their respective stacks for maintaining a substantially constant static pressure within the stacks and a stable air flow from said stacks, said third stack being wide open to deliver a constant volume of air equal to about one-half of the total volume supplied to the mixing chamber at all times, the remaining approximately one-half of the total volume being provided by modulation of the volume control dampers in the first and second stacks to deliver less air from said first stack and more air from said second stack under one set of conditions and more air from the first stack and less from the second stack under another set of conditions whereby to provide a substantially constant total volume of air delivered to the mixing chamber and a stable discharge flow from the discharge outlet of the chamber at all times.

References Cited in the file of this patent

UNITED STATES PATENTS

| | | |
|---|---|---|
| 2,506,700 | Chace | May 9, 1950 |
| 2,508,074 | Miller | May 16, 1950 |
| 2,710,724 | McMahon | June 14, 1955 |
| 2,729,429 | Goemann | Jan. 3, 1956 |
| 2,828,076 | Donahue | Mar. 25, 1958 |
| 2,844,322 | Kautz | July 22, 1958 |
| 2,856,131 | Conlan | Oct. 14, 1958 |

FOREIGN PATENTS

| | | |
|---|---|---|
| 253,317 | Great Britain | June 17, 1926 |